(12) United States Patent
Atkinson et al.

(10) Patent No.: US 11,433,463 B2
(45) Date of Patent: Sep. 6, 2022

(54) PREP BIT

(71) Applicant: Mueller Industries, Inc., Memphis, TN (US)

(72) Inventors: John A. Atkinson, Nashville, TN (US); Jeston S. Cowen, Memphis, TN (US); Justin Gast, Germantown, TN (US); Chris Mueller, Collierville, TN (US)

(73) Assignee: Mueller Industries, Inc., Collierville, TN (US)

( * ) Notice: Subject to any disclaimer, the term of this patent is extended or adjusted under 35 U.S.C. 154(b) by 131 days.

(21) Appl. No.: 16/868,672

(22) Filed: May 7, 2020

(65) Prior Publication Data
US 2021/0346965 A1 Nov. 11, 2021

(51) Int. Cl.
*B23B 51/10* (2006.01)
*B21D 41/02* (2006.01)

(52) U.S. Cl.
CPC .......... *B23B 51/103* (2013.01); *B21D 41/025* (2013.01); *B23B 2220/08* (2013.01)

(58) Field of Classification Search
CPC ....... B23B 51/103; B23B 5/167; B23B 51/02; B23B 2220/08; B21D 41/025; B21D 39/046; B21D 19/08; B21D 39/08; B21D 41/021; B24B 9/007; B23D 77/00; B23D 77/12; B23D 77/14
See application file for complete search history.

(56) References Cited

U.S. PATENT DOCUMENTS

| 2,949,618 | A | * | 8/1960 | Peyser | B23B 51/108 |
| | | | | | 408/112 |
| 3,044,325 | A | * | 7/1962 | Halpern | B23B 51/108 |
| | | | | | 408/119 |
| 6,840,718 | B2 | * | 1/2005 | Newmark | B23G 5/06 |
| | | | | | 408/222 |
| 8,444,353 | B2 | * | 5/2013 | Khangar | B23B 51/0473 |
| | | | | | 408/206 |
| 9,550,223 | B2 | | 1/2017 | Anjos | |
| 11,192,196 | B2 | * | 12/2021 | Hechtle | B23D 77/006 |
| 2008/0006074 | A1 | | 1/2008 | Gaydusek | |
| 2012/0255406 | A1 | * | 10/2012 | Mainolfi | B23B 5/167 |
| | | | | | 82/1.11 |

FOREIGN PATENT DOCUMENTS

| DE | 202004018765 U1 | * | 5/2006 | ........... B21D 19/005 |
| GB | 1398719 A | * | 6/1975 | ........... B21J 15/048 |
| WO | WO-2018156098 A1 | * | 8/2018 | ........... B23B 41/12 |

* cited by examiner

*Primary Examiner* — Boyer D Ashley
*Assistant Examiner* — Reinaldo A Vargas Del Rio
(74) *Attorney, Agent, or Firm* — Harness, Dickey & Pierce, P.L.C.

(57) ABSTRACT

A rotary bit configured to deburr and swage an end of a tube, comprising a first end configured to deburr and swage the end of the tube, and a second end configured to be secured to a rotary device, wherein the first end includes a plurality of blades that extend axially along the first end and radially outward from the rotary bit, the plurality of blades including a plurality of leading blades and a plurality of finishing blades, the leading blades configured to initially deburr and swage the end of the tube upon insertion of the rotary bit into the end of the tube, and the finishing blades configured to complete deburring and swaging of the end of the tube, the finishing blades extending radially outward from the rotary bit to a greater extent than the leading blades.

19 Claims, 13 Drawing Sheets

PREP BIT

FIELD

The present disclosure relates to a rotary bit that is configured to prepare the end of a tube before being fitted into a joint or coupling.

BACKGROUND

This section provides background information related to the present disclosure which is not necessarily prior art.

When attaching a tube to a fitting, the tube is typically first cut from a stock length of tubing that is greater than what is required for a typical application. To cut the tube, a saw or pipe cutter may be used. Regardless which tool is used to cut the tube to the desired length, the application of force to the tube by the tool can form a tapered or conical-shaped end where the outer diameter of the tube is radially inwardly narrowed. This is more prevalent in instances where the tube is formed from a soft metal material. In addition, the use of the tool to cut the tube can leave burrs and other imperfections at the end of the tube. The conical-shaped end and burrs are undesirable in that when the tube is mated with a fitting, a fluid-tight seal is more difficult to achieve whether the tube is crimped to the fitting, brazed or soldered to the fitting, or attached to the fitting in any manner known to one skilled in the art.

For example, if the tube has a conically-shaped end and/or burrs on an end thereof, the fluid flow through the tube and the fitting can become turbulent. Turbulent flow is undesired in applications where the fluid flowing through the tube and fitting is, for example, a medical gas or fluid. Alternatively, if the fitting includes a seal therein, the conically-shaped end and/or burrs can damage the seal during insertion of the tube into the fitting. It is desirable, therefore, to provide a device and method for ensuring that the tube does not have a conically-shaped end and/or burrs before mating the tube with a fitting.

SUMMARY

This section provides a general summary of the disclosure, and is not a comprehensive disclosure of its full scope or all of its features.

The present disclosure provides a rotary bit configured to deburr and swage an end of a tube, comprising a first end configured to deburr and swage the end of the tube, and a second end configured to be secured to a rotary device, wherein the first end includes a plurality of blades that extend axially along the first end and radially outward from the rotary bit, the plurality of blades including a plurality of leading blades and a plurality of finishing blades, the leading blades configured to initially deburr and swage the end of the tube upon insertion of the rotary bit into the end of the tube, and the finishing blades configured to complete deburring and swaging of the end of the tube, the finishing blades extending radially outward from the rotary bit to a greater extent than the leading blades.

The rotary bit may include a finishing collar configured to be secured to the rotary bit between the first end and the second end. The finishing collar defines a shoulder configured for receipt of the end of the tube when the rotary bit is inserted into the end of the tube, and the shoulder is configured to deburr the end of the tube. In some configurations, the finishing collar may include at least one of a plurality of slots formed therein located proximate the shoulder that are each configured to expel material during deburring of the end of the tube, a plurality of chamfers, or a plurality of radially inwardly extending ribs.

The present disclosure also provides a method of attaching a tube to a fitting that includes cutting the tube from a stock length of tube; inserting and energizing a rotary bit into an end of the tube that was cut from the stock length of tube; and attaching and securing the tube to the fitting, wherein the rotary bit includes a first end configured to deburr and swage the end of the tube, and a second end configured to be secured to a rotary device that is configured to energize the rotary bit, the first end including a plurality of blades that extend axially along the first end and radially outward from the rotary bit, the plurality of blades including a plurality of leading blades and a plurality of finishing blades, the leading blades configured to initially deburr and swage the end of the tube upon insertion of the rotary bit into the end of the tube, and the finishing blades configured to complete deburring and swaging of the end of the tube, the finishing blades extending radially outward from the rotary bit to a greater extent than the leading blades.

In the above method, the rotary bit may include a finishing collar configured to be secured to the rotary bit between the first end and the second end. The finishing collar defines a shoulder configured for receipt of the end of the tube when the rotary bit is inserted into the end of the tube, and the shoulder is configured to deburr the end of the tube. In some configurations, the finishing collar may include at least one of a plurality of slots formed therein located proximate the shoulder that are each configured to expel material during deburring of the end of the tube, a plurality of chamfers, or a plurality of radially inwardly extending ribs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, the method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
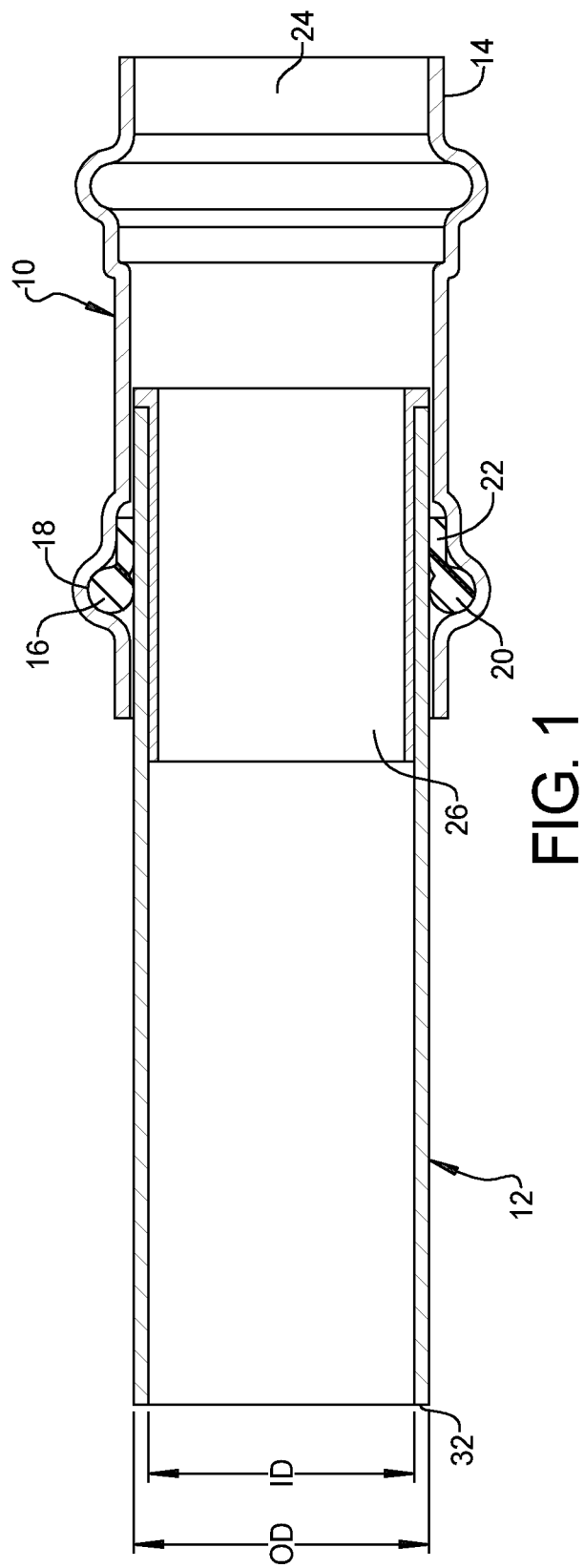
FIG. 1 is a cross-sectional view of a fitting mated with a tube.

Referring to FIG. 1, a membrane press fitting 10 is illustrated where a tube 12 is mated with a fitting 14 having a rubber or polymeric seal 16 provided therein. Although fitting 14 is described herein as including polymeric seal 16, it should be understood that any type of fitting (e.g., fittings that are brazed, soldered, or attached to tube 12 by other means) can be used without departing from the scope of the present disclosure. Fitting 14 has a radially outwardly expanding bulge 18 that is shaped for receipt of seal 16. Seal 16 includes an O-ring portion 20 integral with an annular sleeve 22 that is shaped to correspond to bulge 18. Annular sleeve 22 typically extends from O-ring portion 20 in a direction toward an interior 24 of fitting 14 such that when tube 12 is mated with fitting 14, tube 12 will not unseat seal 16 from bulge 18 or damage seal 16. If seal 16 is unseated or damaged, a fluid-tight connection between tube 12 and fitting 14 typically cannot be obtained. In addition, although not required, membrane press fitting 10 may include a tube insert 26. After tube 12 is mated with fitting 14, a crimping tool (not illustrated) that is configured to crimp fitting 14 on either side of bulge 18 may be used to ensure a fluid-tight connection between fitting 14 and tube 12.

Figure 2:
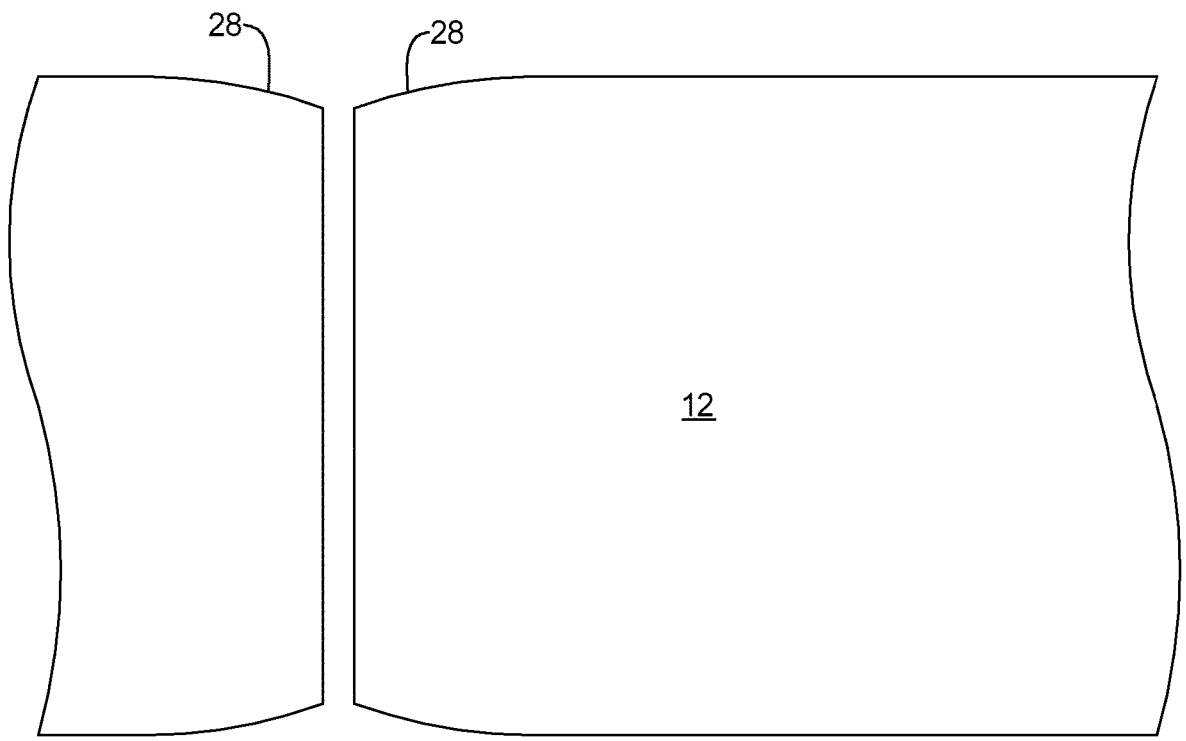
FIG. 2 is a perspective view illustrating the process of cutting a section of tube from a stock length of tubing.
Figure 3:
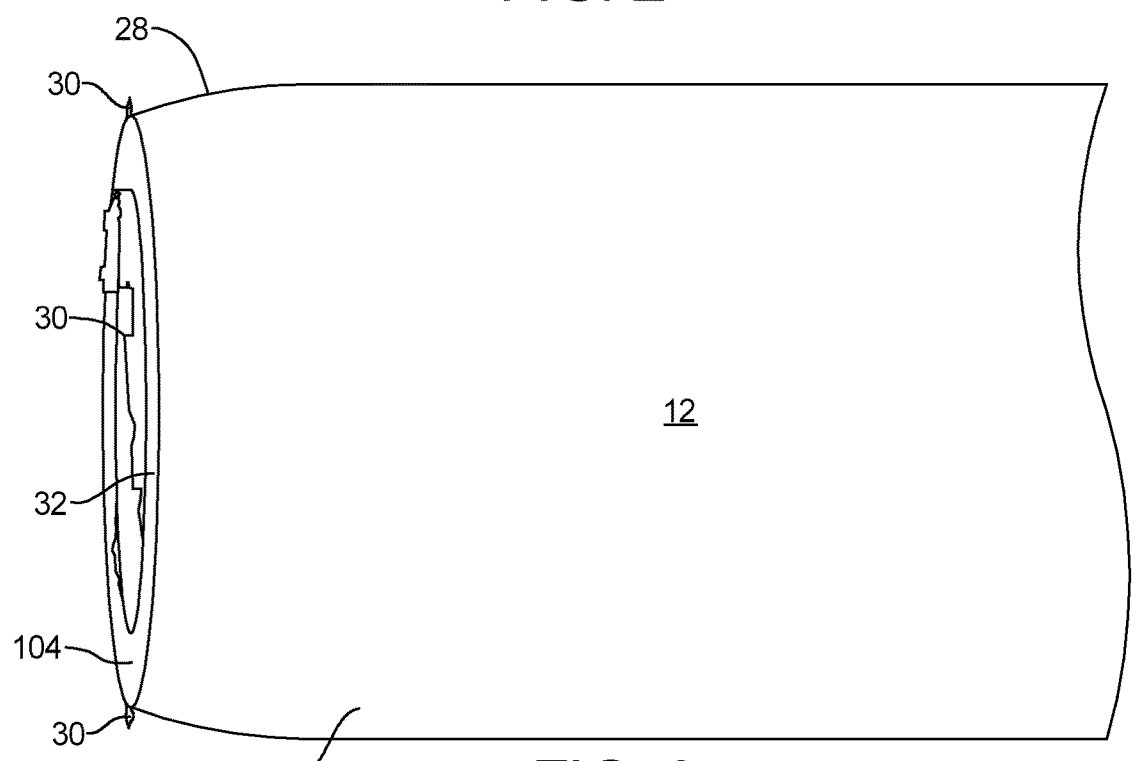
FIG. 3 is a perspective view illustrating a section of tube after being cut from a stock length of tubing.
Figure 4:
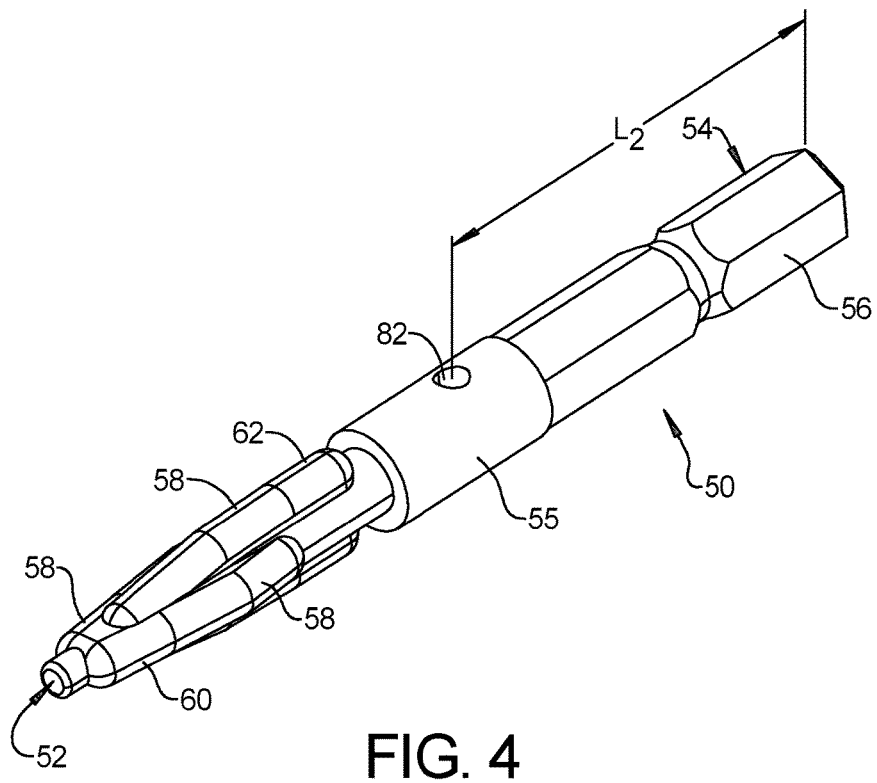
FIG. 4 is a perspective view of a tube preparation bit according to a principle of the present disclosure.
Figure 5:
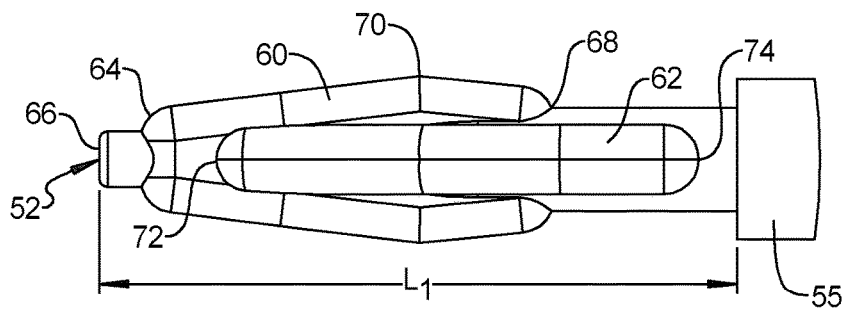
FIG. 5 is a side-perspective view of a swaging portion of the tube preparation bit illustrated in FIG. 4.
Figure 6:
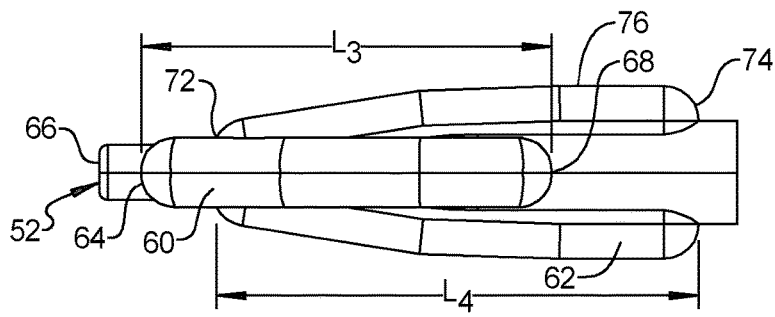
FIG. 6 is another side-perspective view of the swaging portion of the tube preparation bit illustrated in FIG. 4.

As noted above, tube 12 is typically cut from a stock length of tubing using a saw or pipe cutter. The application of force to the tube 12 by the tool can form a tapered or conical-shaped end 28 as shown in FIG. 2 where the outer diameter (OD) of tube 12 is radially inwardly narrowed. In addition, as shown in FIG. 3, the use of tool to cut tube 12 can leave burrs 30 and other imperfections at the end 32 of tube 12. The conical-shaped end 28 and burrs 30 are undesirable in that when tube 12 is mated with fitting 14, a fluid-tight seal is more difficult to achieve during the crimping process due to the burrs 30 being able to damage seal 16, or conically-shaped end 28, making it more difficult to achieve a fluid-tight seal between tube 12 and fitting 14, or the fluid flow through tube 12 and fitting 14 can become turbulent.

FIGS. 4-7 illustrates an example tube preparation bit 50 according to the present disclosure. After tube 12 is cut from the stock length of tubing, preparation bit 50 is configured to finish tube end 32 by removing burrs 30 and expanding tube end 32 such that tube end 32 will no longer have the conically-shaped end 28 shown in FIGS. 2 and 3. In this regard, preparation bit 50 includes a swaging end 52 having a first length L1 that is configured to finish tube end 32, and a connection end 54 having a length L2 that is configured to connect preparation bit 50 to a power drill or driver (not shown) that is used to rotate preparation bit 50. Connection end 54, therefore, includes a hexagonal shape 56 along a length thereof that is configured to mate with a chuck (not shown) of the power drill or driver (not shown), as is well known in the art. Length L1 and length L2 may be equal, or length L1 may be greater than length L2. A coupling section 55 is located between swaging end 52 and connection end 54. In addition to connecting swaging end 52 to connection end 54, coupling section 55 is configured to connect an optional finishing collar 57 (see, e.g., FIGS. 8-12) to preparation bit 50, as will be described in more detail later.

Figure 7:
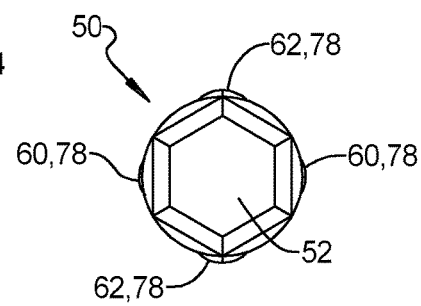
FIG. 7 is an axial-perspective view of the tube preparation bit illustrated in FIG. 4.
Figure 8:
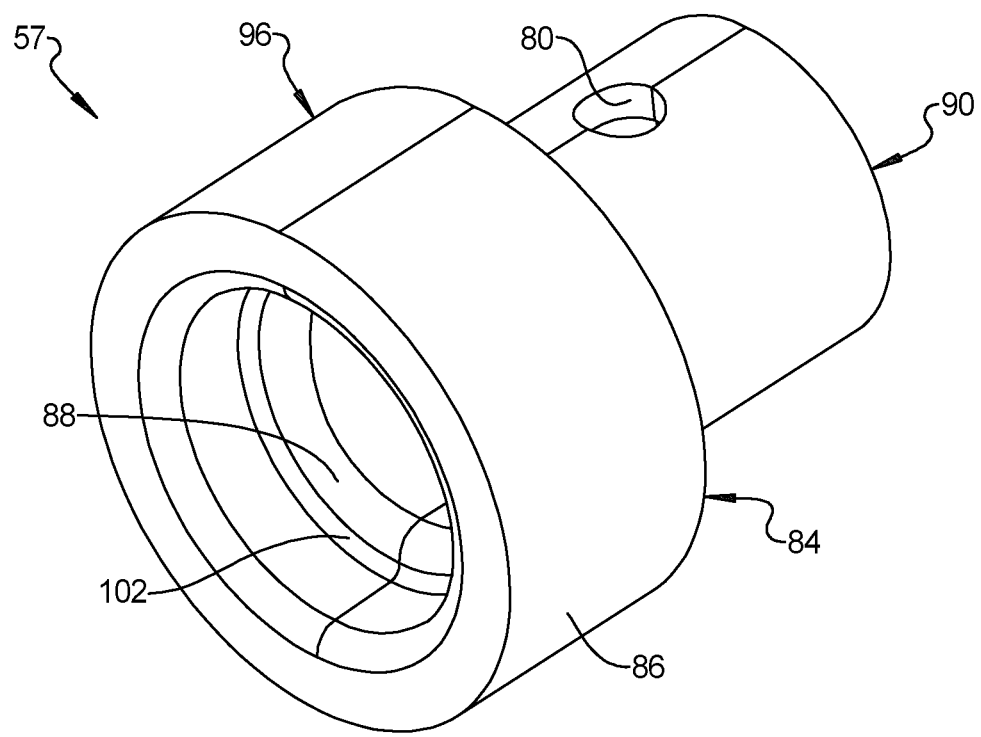
FIG. 8 is a perspective view of a finishing collar according to a principle of the present disclosure.
Figure 9:
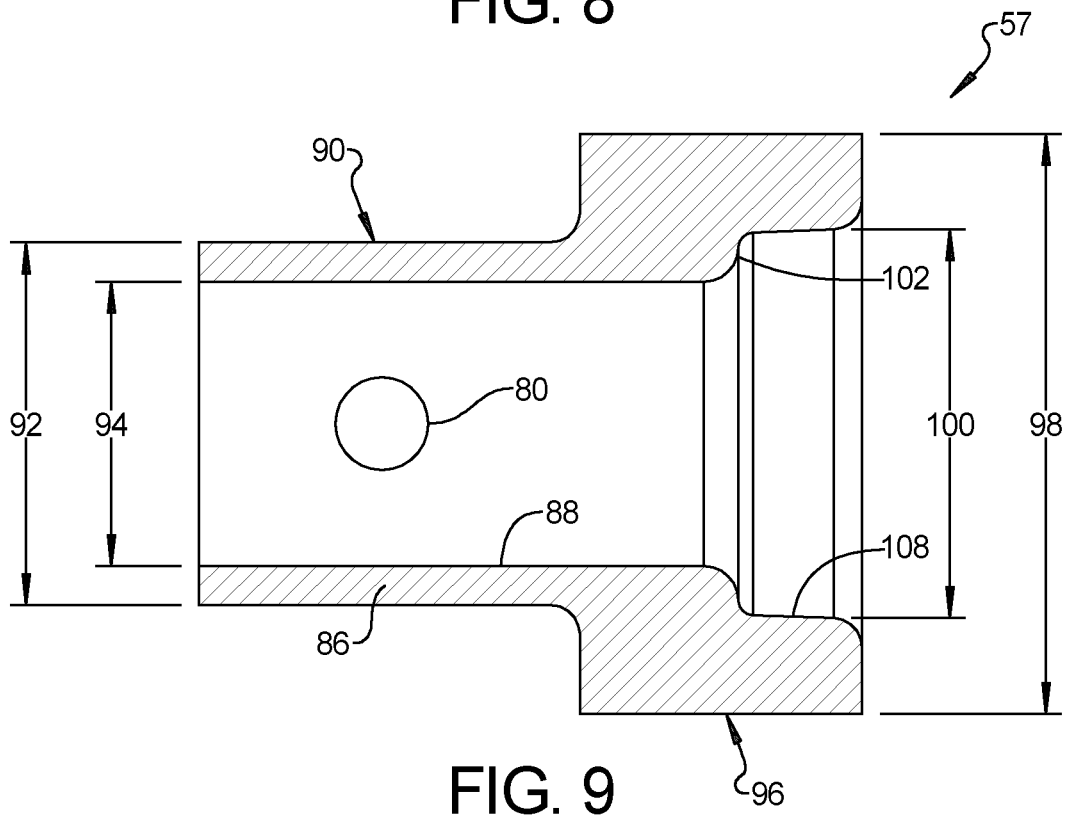
FIG. 9 is a cross-sectional view of the finishing collar illustrated in FIG. 8.

Swaging end 52 of preparation bit 50 is configured to finish tube end 32 and includes a plurality of swage blades 58 that are designed to remove burrs 30 and/or radially expand tube end 32 to remove conically-shaped end 28. Swage blades 58 include a pair of leading blades 60, and a pair of finishing blades 62. The primary difference between leading blades 60 and finishing blades 62 is that finishing blades 62 extend radially outward to a greater extent than leading blades 60 (FIG. 7).

Leading blades 60 are configured to initially contact and remove any burrs 30 that may be present on the inner diameter ID of tube end 32, as well as initiate radial expansion of conically-shaped end 28 of tube 12 to its original outer diameter OD. Leading blades 60 have an axial length L3 that is less than the length L1 of swaging end 52. Leading blades 60 gradually radially expand a diameter of swaging end 52 as leading blades 60 extend axially along swaging end 52. In this regard, leading blades 60 include a leading end 64 at a location positioned just inboard from a terminal end 66 of swaging end 52 and a trailing end 68 that is located inboard from coupling section 55. Leading blades 60 radially expand the diameter of swaging end 52 to the greatest extent at a location 70 (FIG. 5) located between leading end 64 and trailing end 68. As leading blades 60 extend axially from location 70 toward trailing end 68, the radial expansion of the swaging end 52 provided by leading blades 60 decreases so that contact created between tube 12 and the preparation bit 50 transfers from the contact that is provided alone by leading blades 60 to the contact that is provided alone by finishing blades 62.

Finishing blades 62 are configured to finally contact and remove any burrs 30 that may be present on the inner diameter ID of tube end 32, as well as complete radial expansion of conically-shaped end 28 of tube 12 to its original outer diameter OD. Finishing blades 62 have an axial length L4 that is less than the length L1 of swaging end 52. Axial length L4 can be equal to axial length L3 of leading blades 60, or axial length L4 can be greater than axial length L3 of leading blades 60. Finishing blades 62 continue to gradually radially expand a diameter of swaging end 52 as finishing blades 62 extend axially along swaging end 52. In this regard, finishing blades 62 include an initial end 72 at a location positioned just inboard from leading end 64 of leading blades 60 and a final end 74 that is located just inboard from coupling section 55. Finishing blades 62 radially expand the diameter of swaging end 52 to a greater extent than leading blades 60. The greater expansion of the diameter of swaging end 52 in comparison to that provided by leading blades 60 occurs at a position 76 (FIG. 6) located downstream from location 70. In this manner, the contact that occurs between preparation bit 50 and tube 12 only occurs at a single site (i.e., at conically-shaped end 28) during use of preparation bit 50.

While both leading blades 60 and finishing blades 62 have been described above as "blades," it should be understood that leading blades 60 and finishing blades 62 are not designed to cut tube 12. In contrast, as best shown in FIG. 7, both leading blades 60 and finishing blades 62 define a rounded or hemispherical outer surface 78 that is configured to smooth out burrs 30 from inner diameter ID of tube end 32 and radially expand tube 12 to its original outer diameter OD. Tubes 12 that are susceptible to formation of burrs 30 and conically-shaped end 28 are generally formed of "soft" metal materials such as copper. The material of tube 12, therefore, does not need to shaved by a cutting or friction-type "blade," but rather swaged by leading blades 60 and finishing blades 62. Thus, the use of leading blades 60 and finishing blades 62 that define a rounded or hemispherical outer surface 78 are beneficial in removing the burrs 30 and conically-shaped end 28 without creating undesirable additional debris during the finishing process. Moreover, it should be understood that rounded or hemispherical outer surface 78 when in contact with inner diameter ID of tube end 32 or burrs 30 is not designed to create a large amount of friction, which can generate heat that may be undesirable. In contrast, as noted above, the rounded or hemispherical outer surface 78 is designed to simply influence movement of the soft metal material (e.g., copper, or any other soft metal material such as lead, gold, silver, tin, zinc, aluminum, thorium, brass, bronze, and any other soft metal known to one skilled in the art) to expand the conical-shaped end 28, and smooth out the burrs 30. To further assist in avoiding the creation of a large amount of friction, it should be understood that preparation bit 50 can include a finish or plating.

It should be also understood that while preparation bit 50 has been described as including a pair of leading blades 60 and a pair of finishing blades 62, the present disclosure should not be limited thereto. In this regard, a greater or lesser number of leading blades 60, a greater or lesser number of finishing blades 62, or a greater or lesser number of both leading blades 60 and finishing blades 62 may be used without departing from the scope of the present disclosure, as will be described later.

Now a description of a finishing process using preparation bit 50 will be described. After cutting tube 12 from a stock length of tubing as shown in FIGS. 2 and 3, it is necessary to remove burrs 30 from the tube end 32 as well as radially expand tube end 32 to the original outer diameter of tube 12. Preparation bit 50 is connected to a power drill or driver (not shown) by securing connection end 54 to the chuck (not shown) of the power drill or driver. Preparation bit 50 is then inserted into tube end 32 and the power drill or driver is energized to rotate preparation bit 50 at a high rate. Alternatively, power drill or driver can be energized before being inserted into tube. Regardless, as preparation bit 50 is inserted into tube end 32, leading blades 60 will begin to contact burrs 30 and inner diameter ID of tube end 32. Contact between burrs 30 and leading blades 60 will begin to smooth burrs 30.

Then, as preparation bit 50 is further inserted into tube end 32, the leading blades 60 will begin to radially expand conically-shaped end 28 due to the leading blades 60 radially expanding the diameter of preparation bit 50 at location 70. As preparation bit 50 is further inserted into tube end 32, contact between leading blades 60 and inner diameter ID of the tube end 32 will decrease and transition to contact between finishing blades 62 and inner diameter ID of tube end 32. This is because, as noted above, finishing blades 62 radially expand the diameter of swaging end 52 to a greater extent than leading blades 60. As finishing blades 62 contact inner diameter ID of tube 12, the tube end 32 will be expanded by finishing blades 62 such that tube end 32 is returned to its original outer diameter OD. After preparation bit 50 has been fully inserted into tube end 32 and used to finish tube end 32 for a sufficient amount of time (e.g., 3-10 seconds), preparation bit 50 may be removed from tube end 32 and tube 12 may be mated and subsequently attached to fitting 14 by crimping, brazing, soldering, or any other attachment method known to one skilled in the art.

In some instances, the use of preparation bit 50 alone may be insufficient to remove all of the burrs 30 that may be formed on tube end 32. In this regard, burrs 30 may not necessarily be located at the inner diameter (ID) of tube end 32 and, therefore, are not provided at a location that can be contacted with leading blades 60 and finishing blades 62. That is, the burrs 30 may be formed on the outer diameter OD of the tube 12 as shown in FIG. 3. In addition, the leading blades 60 and finishing blades 62 may sometimes roll a material of the tube 12 to the outer diameter OD of the tube 12. Thus, in order to remove the burrs 30 that cannot be contacted by preparation bit 50, the installer must conduct additional steps (e.g., sanding and/or polishing) on the tube end 32 before the tube 12 can be mated and attached to fitting 14, which is undesirable and wasteful of time.

To avoid these additional steps, preparation bit 50 may include a finishing collar 57. As best shown in FIGS. 8-12, finishing collar 57 may be a separate piece that is secured to preparation bit 50 at coupling section 55. In this regard, finishing collar 57 may include a pair of apertures 80 that are configured to align with an aperture 82 formed in coupling section 55. A bolt or some other fastener may then be passed through apertures 80 and 82 to secure finishing collar 57 to coupling section 55 (FIG. 13). Alternatively, finishing collar 57 may be permanently secured to coupling section 55 by brazing, welding, or the like such that finishing collar 57 is unitary or monolithic with preparation bit 50.

Finishing collar 57 is a cylindrical member 84 including an exterior surface 86 and an interior surface 88. An attachment end 90 that is configured to mate and be secured to coupling section 55 includes a first outer diameter 92 and a first inner diameter 94. A finishing end 96 of finishing collar 57 includes a second outer diameter 98 and a second inner diameter 100. A shoulder 102 is provided within finishing end 96 that is defined by the difference between first inner diameter 94 and second inner diameter 100. When finishing collar 57 is attached or unitary with preparation bit 50, and when preparation bit 50 is fully inserted into tube end 32, the terminal surface 104 of tube end 32 that may include burrs 30 is abutted against shoulder 102. As preparation bit 50 and finishing collar 57 rotate, any burrs 30 on terminal surface 104 will be eliminated. In addition, any exterior imperfections around the exterior surface 106 of tube 12 will be eliminated by inner diameter surface 108 of finishing collar 57.

Figure 10:
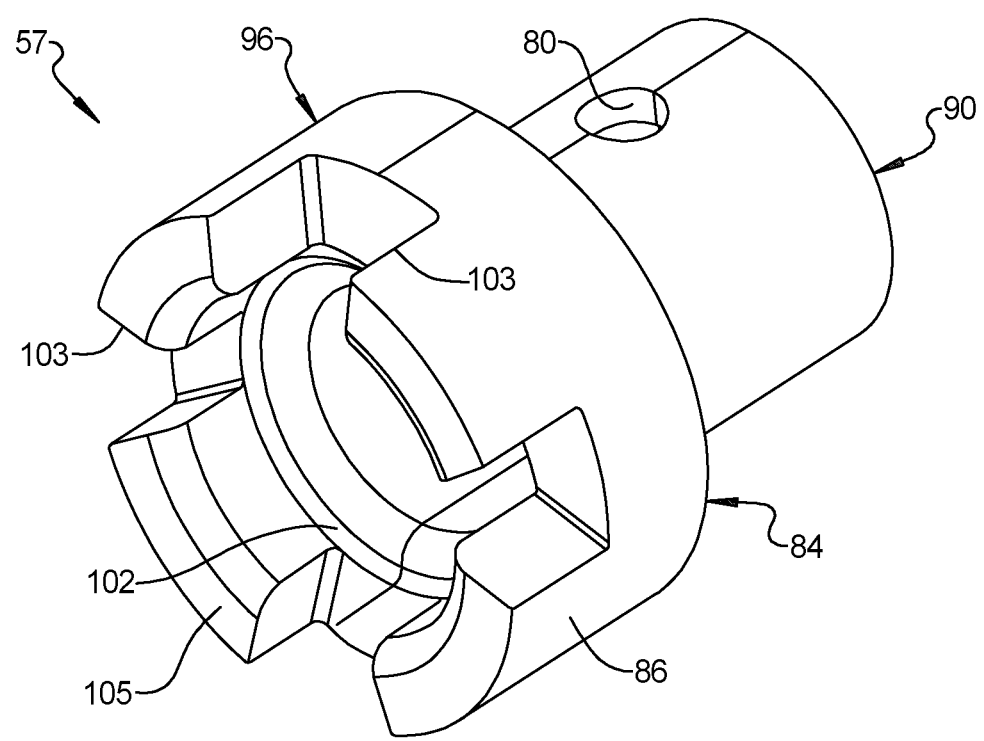
FIG. 10 is a perspective view of another finishing collar according to a principle of the present disclosure.
Figure 11:
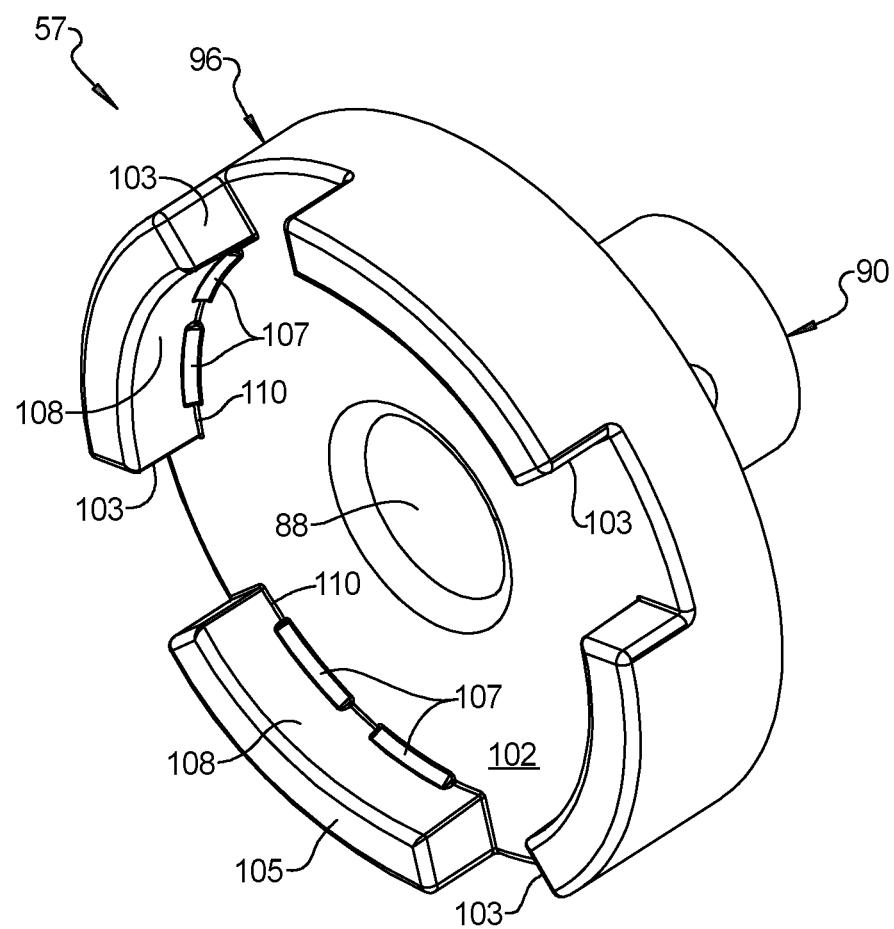
FIG. 11 is a perspective view of another finishing collar according to a principle of the present disclosure.

Although not required, as shown in FIGS. 10 and 11, finishing collar 57 may have a plurality of slots 103 formed in finishing end 96. Slots 103 allow for any debris that may arise during the finishing process to be expelled. Although slots 103 are illustrated as being rectangular shaped and intersecting terminal end 105, it should be understood that slots 103 may be any shape (e.g., rounded, triangular, and the like), may vary in size and spacing, and may be spaced apart from terminal end 105 (i.e., slots 103 can be in the form of an aperture). It should also be understood, however, that preparation bit 50 and finishing collar 57 are not designed to generate debris during use thereof. In contrast, as noted above, the preparation bit 50 and finishing collar 57 are each designed to simply influence movement of the soft metal material to expand the conical-shaped end 28, and smooth out the burrs 30. Regardless, in the event that the debris is generated, it may be expelled through slots 103 during the use of preparation bit 50 and finishing collar 57. Similar to preparation bit 50, finishing collar 57 can include a finish or plating to assist in avoiding the creation of a large amount of friction.

In addition, as best shown in FIG. 11, finishing collar 57 may include a plurality of chamfers 107 formed at the interface 110 between shoulder 102 and inner diameter surface 108, which further assist in finishing tube end 32. Although illustrated in connection with finishing collar 57 that includes slots 103, it should be understood that the finishing collar 57 illustrated in FIG. 8 may also include chamfers 107.

Figure 12:
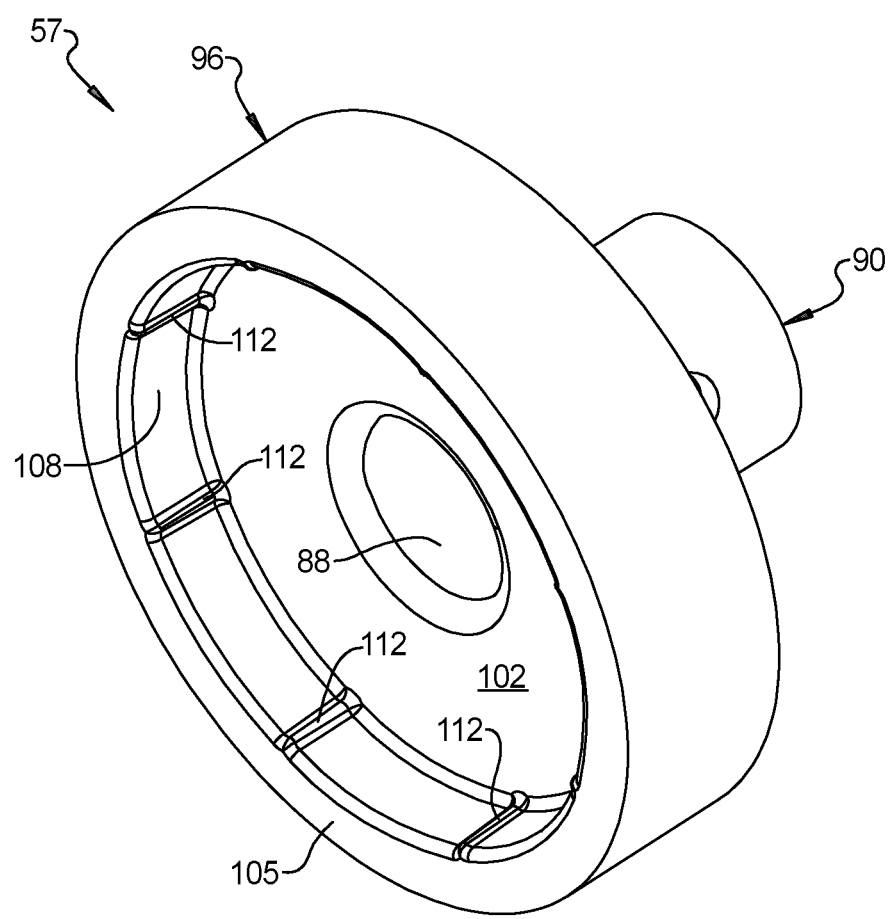
FIG. 12 is a perspective view of another finishing collar according to a principle of the present disclosure.
Figure 13:
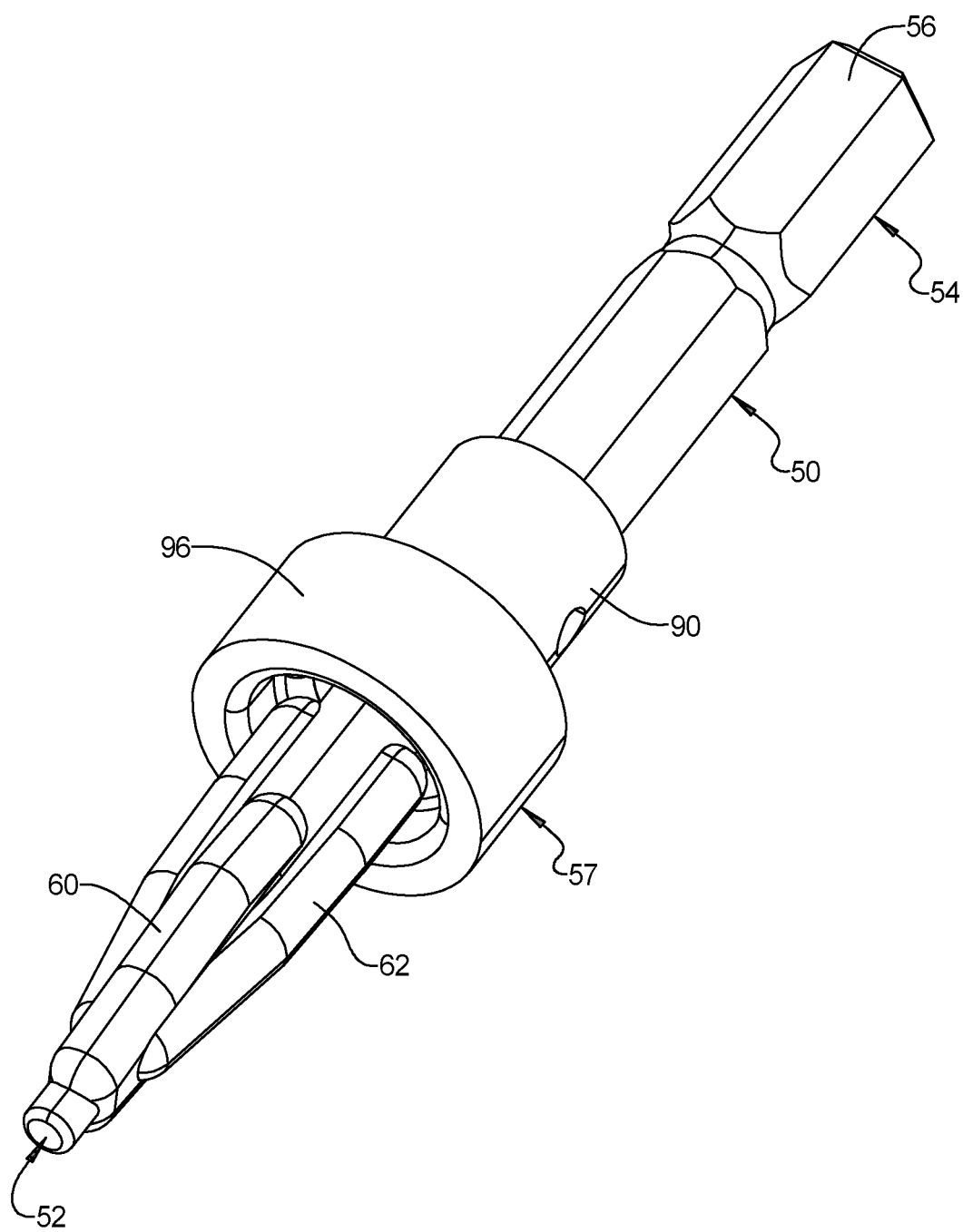
FIG. 13 is a perspective view of the tube preparation bit illustrated in FIG. 4 including the finishing collar illustrated in FIG. 8 secured thereto.

As an alternative to chamfers 107, as shown in FIG. 12, finishing collar 57 may include a plurality of radially inwardly extending ribs 112 spaced about inner diameter surface 108, which further assist in finishing tube end 32. Ribs 112 may have an axial length equal to or less than the axial length of inner diameter surface 108. Although ribs 112 are illustrated in connection with finishing collar 57 that does not include slots 103, it should be understood that finishing collar 57 illustrated in FIG. 10 that includes slots 103 may also include ribs 112.

In any of the above configurations of finishing collar 57, it is important to note that the purpose of finishing collar 57 is to contact the terminal surface 104 and outer diameter OD of tube end 32 to reduce and/or remove burrs 30 formed at terminal surface 104 and outer diameter OD of tube end 32. In addition, finishing collar 57 assists in ensuring that tube end 32 has the correct outer diameter OD so that tube 12 can be smoothly inserted into fitting 10, especially fittings 10 that may include an internal seal 16.

Figure 14:
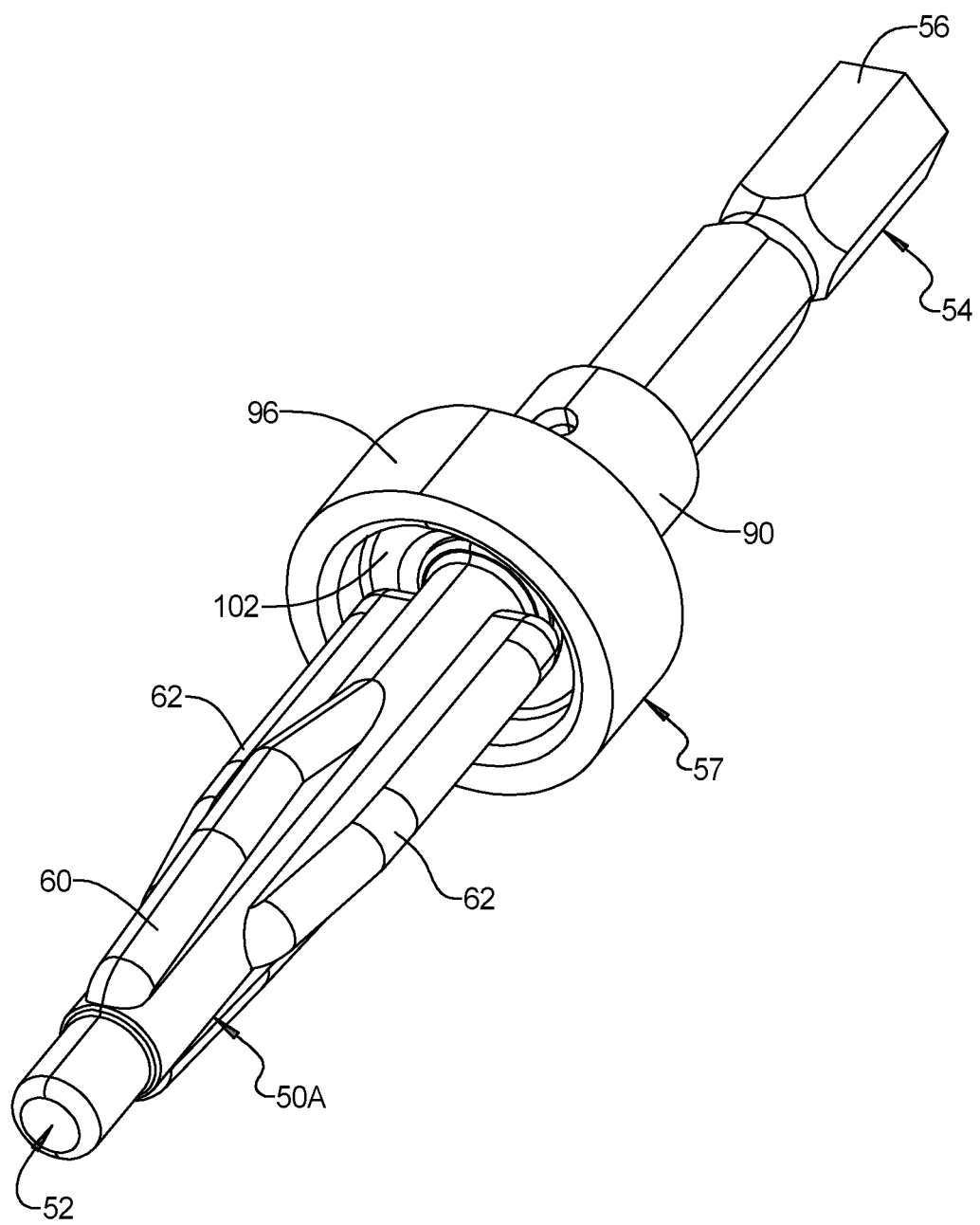
FIG. 14 is a perspective view of another tube preparation bit having a finishing collar secured thereto according to a principle of the present disclosure.
Figure 15:
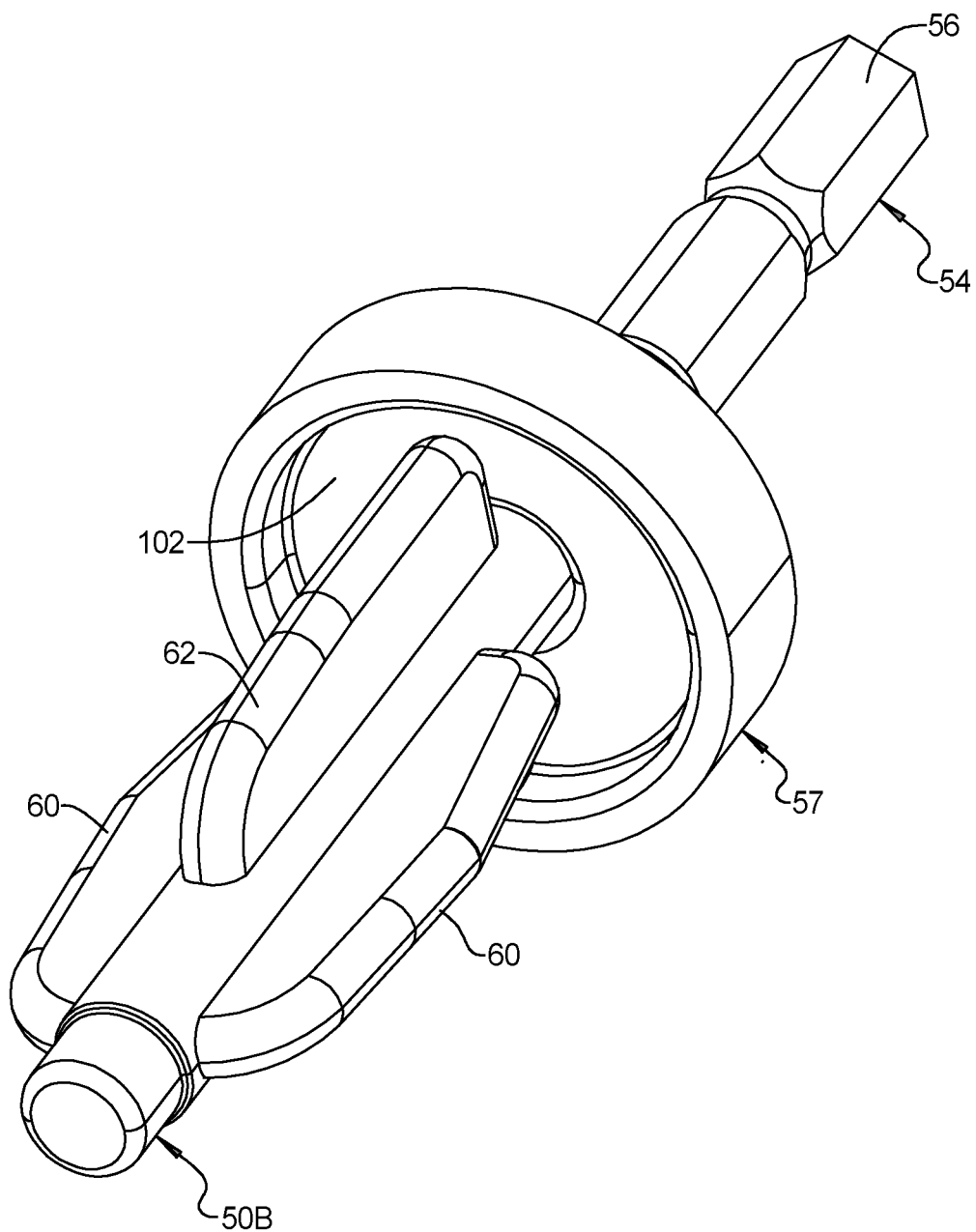
FIG. 15 is a perspective view of another tube preparation bit having a finishing collar secured thereto according to a principle of the present disclosure.

The above-noted disclosure and FIGS. 4-12 are directed to, for example, a ⅜" preparation bit 50. The present disclosure, however, contemplates that preparation bit 50 can be modified to have different sizes. For example, FIG. 14 illustrates a preparation bit 50A that is a ½" preparation bit, and FIG. 15 illustrates a preparation bit 50B that is a ⅞" preparation bit. Larger or smaller sizes are also contemplated. The primary difference between preparation bit 50 and preparation bits 50A and 50B is that leading blades 60 and finishing blades 62 extend radially outward to a greater extent for preparation bits 50A and 50B. Nonetheless, leading blades 60 and finishing blades 62 of preparation bits 50A and 50B are designed to function in the same manner as those of preparation bit 50. Moreover, it should be understood that the larger size preparation bits 50A and 50B may also be used in conjunction with a correspondingly sized finishing collar 57.

Figure 16:
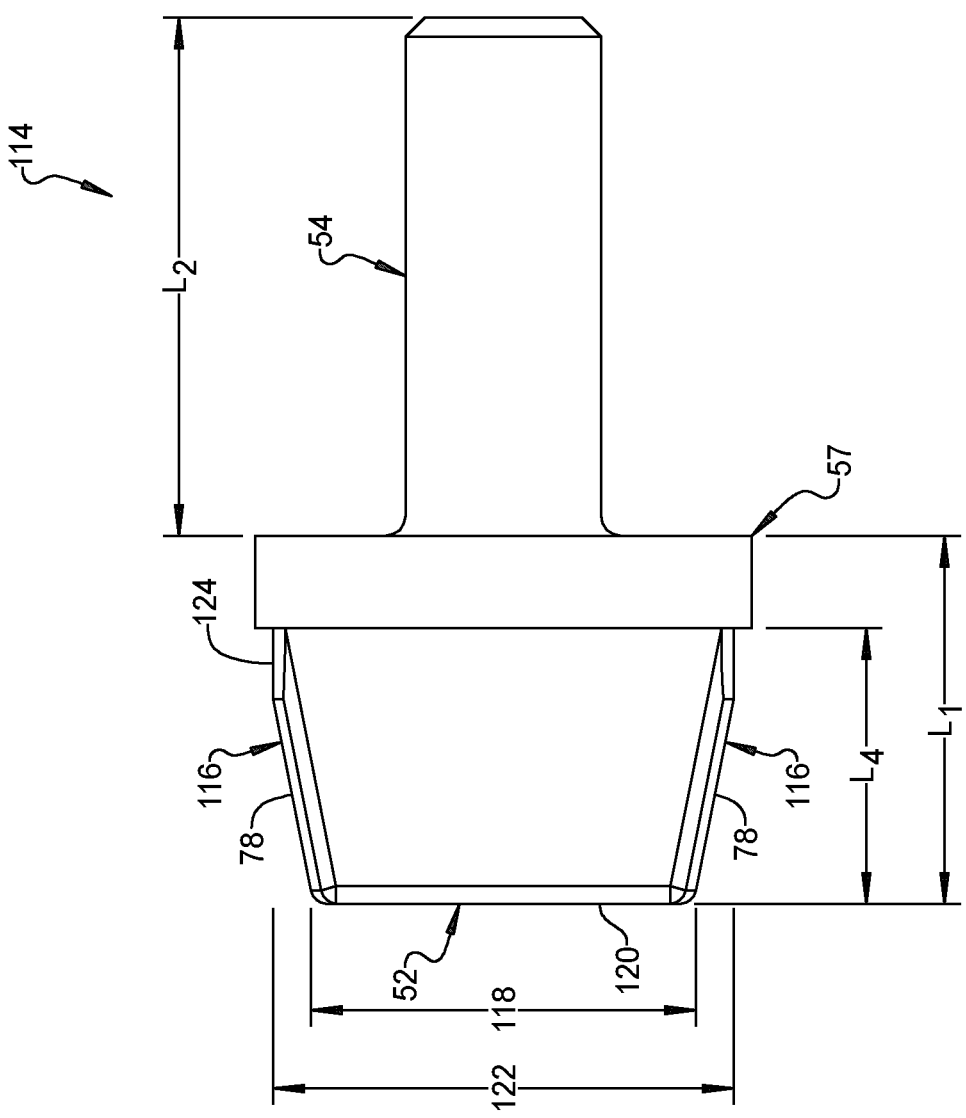

As noted above, a greater or lesser number of leading blades 60, a greater or lesser number of finishing blades 62, or a greater or lesser number of both leading blades 60 and finishing blades 62 may be used without departing from the scope of the present disclosure. For example, referring to FIGS. 16 and 17, a tube preparation bit 114 is illustrated that includes a single pair of swaging blades 116 that function in a manner similar to finishing blades 62 described above.

Preparation bit 114 includes a swaging end 52 having a first length L1 that is configured to finish tube end 32, and a connection end 54 having a length L2 that is configured to connect preparation bit 114 to a power drill or driver (not shown) that is used to rotate preparation bit 114. Although not illustrated in FIGS. 16 and 17, connection end 54 includes a hexagonal shape similar to or the same as that shown in, for example, FIG. 4 as is well known in the art. Length L1 and length L2 may be equal, length L1 may be greater than length L2, or length L2 may be greater than length L1. An optional finishing collar 57 may also be attached to or unitary with preparation bit 114. Finishing collar 57 may be as illustrated, or similar to or the same as those illustrated in FIGS. 8 and 10-12.

Swaging blades 116 are designed to remove burrs 30 while radially expanding tube end 32 to remove or reshape the conically-shaped end 28. In this regard, swaging blades 116 are configured to initially contact and remove any burrs 30 that may be present on the inner diameter ID of tube end 32, as well as complete radial expansion of conically-shaped end 28 of tube 12 to its original outer diameter OD. Swaging blades 116 have an axial length L4 that is less than the length L1 of swaging end 52. Swaging blades 116 have a first outer diameter 118 at a first end 120 that gradually radially expands outward to a second outer diameter 122 at a second end 124 as swaging blades 116 extend axially along swaging end 52, which allows the conically-shaped end 28 to be radially expanded as well as deburred.

Figure 17:
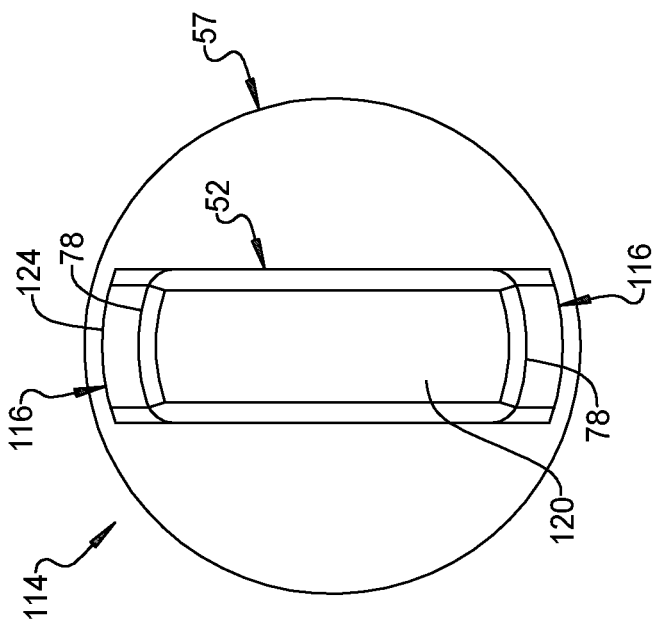
FIGS. 16 and 17 illustrate another tube preparation bit according to a principle of the present disclosure.

Similar to leading and trailing blades 60 and 62, swaging blades 116 are not designed to cut tube 12. In contrast, as best shown in FIG. 17, swaging blades 116 define a rounded or hemispherical outer surface 78 that is configured to smooth out burrs 30 from inner diameter ID of tube end 32 and to radially expand tube 12 to its original outer diameter OD. The rounded or hemispherical outer surface 78 is designed to simply influence movement of the soft metal material (e.g., copper, or any other soft metal material such as lead, gold, silver, tin, zinc, aluminum, thorium, brass, bronze, and any other soft metal known to one skilled in the art) to expand the conical-shaped end 28, and smooth out the burrs 30. To further assist in avoiding the creation of a large amount of friction, it should be understood that preparation bit 114 can include a finish or plating.

Figure 18:
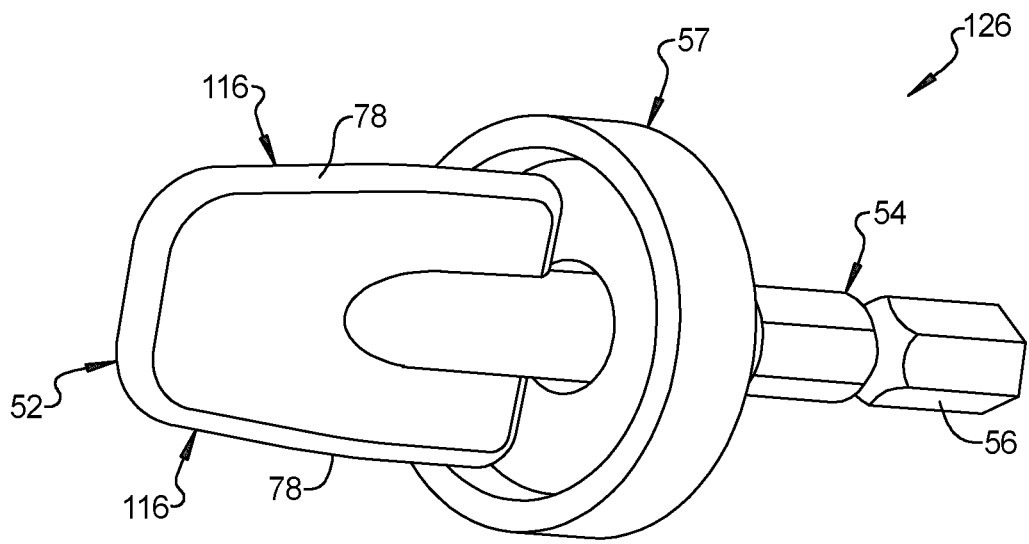
FIG. 18 illustrates another tube preparation bit according to a principle of the present disclosure.

Another tube preparation bit 126 that is similar to tube preparation bit 114 is illustrated in FIG. 18. In this regard, as shown in FIG. 18, tube preparation bit 126 includes only a pair of swaging blades 116. Tube preparation bit 126 is different, however, from tube preparation bit 114 in the shape of the swaging blades 116. Specifically, the swaging blades 116 are the same as finishing blades 62 shown in FIG. 15 that correspond to tube preparation bit 50B, with the leading blades 60 removed. Inasmuch as the features of finishing blades 62 are fully described above, further description of them here is omitted. Tube preparation bit 126 is also illustrated as including finishing collar 57. It should be understood, however, that any of the finishing collars 57 illustrated in FIGS. 8 and 10-12 may be used without departing from the present disclosure.

Figure 19:
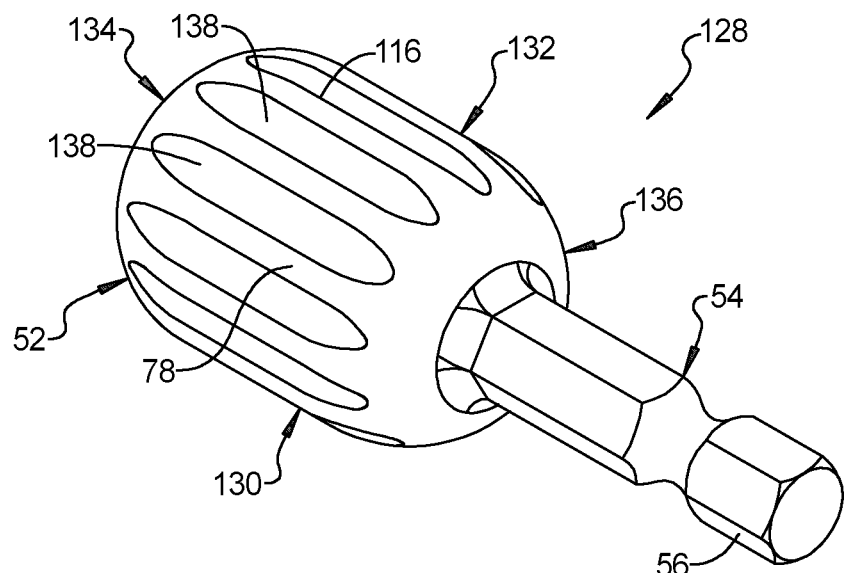
FIGS. 19 and 20 illustrate another tube preparation bit according to a principle of the present disclosure.
Figure 20:
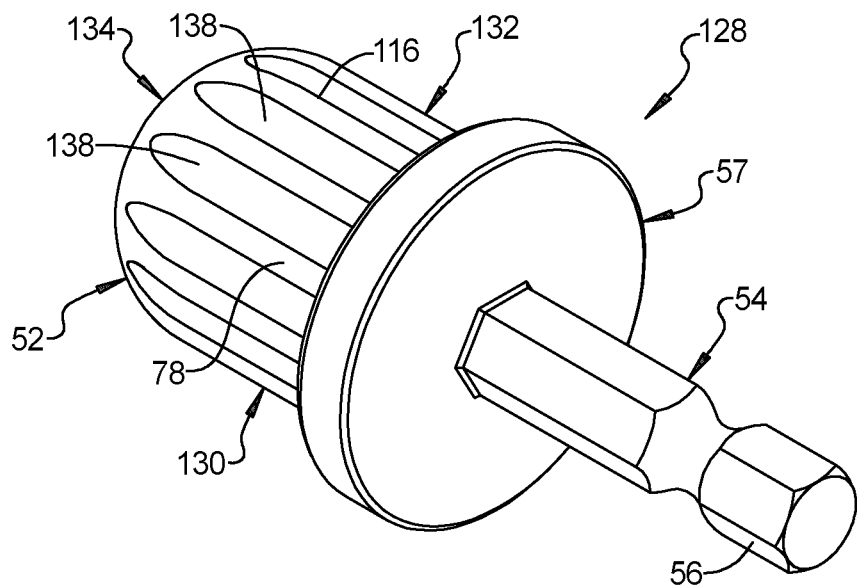

Yet another embodiment of a tube preparation bit is illustrated in FIGS. 19 and 20. The tube preparation bit 128 illustrated in FIGS. 19 and 20 is different from the embodiments described above in that tube preparation bit 128 is defined by a bulbous swaging portion 52 that defines a plurality of swaging blades 116 formed about a circumference 130 thereof. More specifically, bulbous swaging portion 52 is a generally cylindrically-shaped body 132 including a rounded or hemisphere-shaped first end 134 and a rounded or hemisphere-shaped second end 136. The hemisphere-shaped first and second ends 134 and 136 enable the greatest outer diameter of the bulbous swaging portion 52 to be positioned at a location directly between the first and second ends 134 and 136, which assists in radially expanding the tube 12 and smooth out burrs 30. It should be understood, however, that the radius of curvature of each of the hemisphere-shaped first and second ends 134 and 136 can be adjusted to move the greatest diameter of the bulbous swaging portion 52 toward first end 134 or toward second end 136 without limitation.

Swaging blades 116 extend axially from a position located just axially inboard from first end 134 to a position located just axially inboard from second end 136, and are separated by oval-shaped recesses 138 that are formed in cylindrically-shaped body 132. Because swaging blades 116 are formed by forming the oval-shaped recesses 138 in the bulbous swaging end 52, each of the swaging blades 116 define a rounded or hemispherical outer surface 78 that is configured to smooth out burrs 30 from inner diameter ID of tube end 32 and to radially expand tube 12 to its original outer diameter OD. The rounded or hemispherical outer surface 78 is designed to simply influence movement of the soft metal material (e.g., copper, or any other soft metal material such as lead, gold, silver, tin, zinc, aluminum, thorium, brass, bronze, and any other soft metal known to one skilled in the art) to expand the conical-shaped end 28, and smooth out the burrs 30. To further assist in avoiding the creation of a large amount of friction, it should be understood that preparation bit 114 can include a finish or plating.

Tube preparation bit 128 is designed for use either with (FIG. 20) or without (FIG. 19) a finishing collar 57. If a finishing collar 57 is used, the finishing collar 57 may be attached to or may be unitary with tube preparation bit 128. Further, any of the finishing collars 57 shown in FIGS. 8 and 10-12 can be used without limitation.

Figure 21:
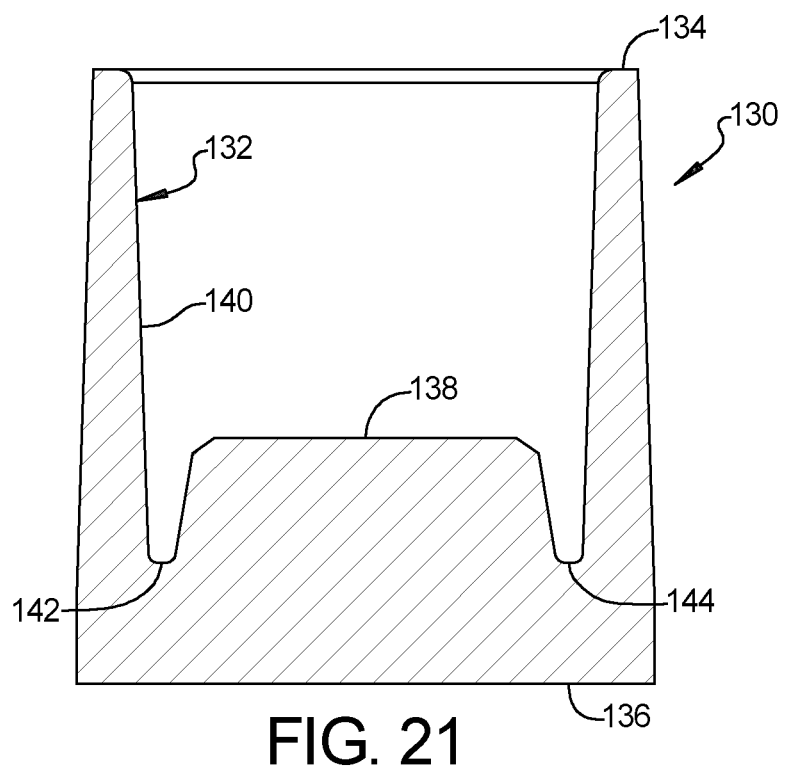
FIG. 21 illustrates a tube rounding device according to a principle of the present disclosure.

After use of the tube preparation bits described above, it still may be desirable to attempt to further "round" the tube end 32 in order to further prevent unseating seal 16 from bulge 18, or to further ensure that seal 16 is not damaged during insertion of tube 12 into fitting 14. To further "round" the tube end 32, after finishing with the tube preparation bit, the finished tube 12 may optionally be inserted into a tube rounder device 130, which is illustrated in FIG. 21. Tube rounder device 130 is a generally cylindrically-shaped member having an axially-extending recess 132 formed therein such that tube rounder device 130 has an open insertion end 134 and a closed finishing end 136. An upstanding boss 138 is formed at closed finishing end 136 that is spaced apart from a surface 140 of axially-extending recess 132, wherein an interface 142 between the axially-extending recess 132 and the boss 138 defines a rounded surface 144. Tube 12 may be inserted into tube rounder device 130 until tube end 32 is seated at the rounded surface 144. Then, upon axial and rotational pressure being applied to tube 12, the tube end 32 may be rounded to correspond to the shape of rounded surface 144. This should be easily accomplished due to tube 12 being formed of a "soft" metal material (e.g., copper, or any other soft metal material such as lead, gold, silver, tin, zinc, aluminum, thorium, brass, bronze, and any other soft metal known to one skilled in the art). After this optional step of rounding the tube end 32, tube 12 is free to be mated with fitting 14.

Lastly, it should be understood that tube 12 may be subjected to finishing and radial expansion by more than one of the tube preparation bits described above. For example, tube 12 may first be subjected to finishing and radial expansion using one or more of the tube preparation bits illustrated in FIGS. 4-7, 13, 14, and 15 (with or without one of the finishing collars 57 illustrated in FIGS. 8 and 10-12), and then subjected to finishing and radial expansion with the tube preparation bit illustrated in FIG. 19 (with or without one of the finishing collars 57 illustrated in FIGS. 8 and 10-12). Any combination or sequence of use of the various tube preparation bits is contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rotary bit configured to deburr and swage an end of a tube, comprising a first end configured to deburr and swage the end of the tube, and a second end configured to be secured to a rotary device, wherein the first end includes a plurality of blades that extend axially along the first end and radially outward from the rotary bit, the plurality of blades including a plurality of leading blades and a plurality of finishing blades, the leading blades configured to initially deburr and swage the end of the tube upon insertion of the rotary bit into the end of the tube, and the finishing blades configured to complete deburring and swaging of the end of the tube, the finishing blades extending radially outward from the rotary bit to a greater extent than the leading blades, wherein at least a portion of an axial length of the plurality of leading blades overlaps a portion of an axial length of the plurality of finishing blades.

2. The rotary bit according to claim 1, wherein the plurality of leading blades includes at least a pair of leading blades located on opposing sides of the first end, and the plurality of finishing blades includes at least a pair of finishing blades located on opposing sides of the first end.

3. The rotary bit according to claim 1, wherein the plurality of finishing blades extend radially outward from the rotary bit to the greater extent in comparison to the plurality of leading blades such that, during use of the rotary bit, contact created between the plurality of leading blades and the end of the tube ends and transitions to contact created between the plurality of finishing blades and the end of the tube.

4. The rotary bit according to claim 1, further comprising a finishing collar configured to be secured to the rotary bit between the first end and the second end.

5. The rotary bit according to claim 4, wherein the finishing collar defines a shoulder configured for receipt of the end of the tube when the rotary bit is inserted into the end of the tube, and the shoulder is configured to deburr the end of the tube.

6. The rotary bit according to claim 5, wherein the finishing collar includes a plurality of slots formed therein located proximate the shoulder that are each configured to expel material during deburring of the end of the tube.

7. The rotary bit according to claim 5, wherein the shoulder includes a plurality of chamfers.

8. The rotary bit according to claim 4, wherein the finishing collar includes a plurality of radially inwardly extending ribs.

9. The rotary bit according to claim 1, wherein the plurality of finishing blades are located axially downstream from the plurality of leading blades.

10. The rotary bit according to claim 1, wherein the plurality of leading blades includes at least a pair of leading blades located on opposing sides of the swaging end, and the plurality of finishing blades includes at least a pair of finishing blades located on opposing sides of the swaging end.

11. A rotary bit configured to deburr and swage an end of a tube, comprising:
   a cylindrical body having a swaging end configured to deburr and swage the end of the tube, a connection end configured to be secured to a rotary device, and a coupling section between and connecting the swaging end and the connection end;
   a plurality of blades that extend axially along the swaging end and radially outward from the cylindrical body, the plurality of blades including a plurality of leading blades and a plurality of finishing blades, the leading blades configured to initially deburr and swage the end of the tube upon insertion of the rotary bit into the end of the tube, and the finishing blades configured to complete deburring and swaging of the end of the tube, the finishing blades extending radially outward from the cylindrical body to a greater extent than the leading blades; and
   a finishing collar configured to be secured to the coupling section, the finishing collar defining a shoulder configured for receipt of the end of the tube when the rotary bit is inserted into the end of the tube, and the shoulder is configured to deburr the end of the tube,
   wherein at least a portion of an axial length of the plurality of leading blades overlaps a portion of an axial length of the plurality of finishing blades.

12. The rotary bit according to claim 11, wherein the plurality of finishing blades extend radially outward from the cylindrical body to the greater extent in comparison to the plurality of leading blades such that, during use of the rotary bit, contact created between the plurality of leading blades and the end of the tube ends and transitions to contact created between the plurality of finishing blades and the end of the tube.

13. The rotary bit according to claim 11, wherein the plurality of finishing blades are located axially downstream from the plurality of leading blades.

14. The rotary bit according to claim 11, wherein the finishing collar includes a plurality of slots formed therein located proximate the shoulder that are each configured to expel material during deburring of the end of the tube.

15. The rotary bit according to claim 11, wherein the shoulder includes a plurality of chamfers.

16. The rotary bit according to claim 11, wherein the finishing collar includes a plurality of radially inwardly extending ribs.

17. A rotary bit configured to deburr and swage an end of a tube, comprising a first end configured to deburr and swage the end of the tube, and a second end configured to be secured to a rotary device, wherein the first end includes a pair of blades that extend axially along the first end and radially outward from the rotary bit, the pair of blades being configured to initially deburr and swage the end of the tube upon insertion of the rotary bit into the end of the tube, and radially expand the end of the tube as the rotary bit is further inserted into the end of the tube,
   wherein an entirety of each blade of the pair of blades is configured to deburr, swage, and radially expand the end of the tube without cutting or shaving a material of the tube.

18. The rotary bit according to claim 17, wherein the pair of blades define a first diameter that radially increases to a second diameter as the pair of blades extend axially along the first end.

19. The rotary bit according to claim 17, further comprising a finishing collar configured to be secured to the rotary bit between the first end and the second end.

\* \* \* \* \*